United States Patent
Dahiya et al.

(10) Patent No.: US 12,436,886 B2
(45) Date of Patent: Oct. 7, 2025

(54) CACHING STRATEGY BASED ON MODEL EXECUTION TIME

(71) Applicant: Oracle International Corporation, Redwood Shores, CA (US)

(72) Inventors: Aneesh Dahiya, Zurich (CH); Renata Khasanova, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/403,946

(22) Filed: Jan. 4, 2024

(65) Prior Publication Data

US 2025/0225076 A1 Jul. 10, 2025

(51) Int. Cl.
  *G06F 12/0802* (2016.01)
  *G06F 16/22* (2019.01)
  *G06N 20/00* (2019.01)

(52) U.S. Cl.
  CPC ...... *G06F 12/0802* (2013.01); *G06F 16/2255* (2019.01); *G06N 20/00* (2019.01)

(58) Field of Classification Search
  CPC .. G06F 12/0802; G06F 16/2255; G06N 20/00
  See application file for complete search history.

(56) References Cited

U.S. PATENT DOCUMENTS

| | | | |
|---|---|---|---|
| 6,266,742 B1 | 7/2001 | Challenger | |
| 6,529,896 B1 | 3/2003 | Leung et al. | |
| 6,754,662 B1 | 6/2004 | Li | |
| 9,183,254 B1 | 11/2015 | Cole | |
| 9,773,026 B1 | 9/2017 | Tetreault | |
| 10,685,295 B1* | 6/2020 | Ross | G06N 20/00 |
| 12,045,698 B1 | 7/2024 | May | |
| 2003/0225974 A1 | 12/2003 | Bopardikar | |
| 2006/0026115 A1 | 2/2006 | Ahmed | |
| 2006/0101001 A1 | 5/2006 | Lindsay | |
| 2007/0250473 A1 | 10/2007 | Larson | |
| 2009/0182720 A1 | 7/2009 | Cain et al. | |
| 2010/0332436 A1* | 12/2010 | Yanagisawa | G06N 5/02 706/46 |
| 2011/0055246 A1 | 3/2011 | Le Biannic et al. | |
| 2011/0137917 A1 | 6/2011 | Boland et al. | |

(Continued)

OTHER PUBLICATIONS

U.S. Appl. No. 14/033,358, filed Sep. 20, 2013, Office Action, Apr. 6, 2016.

(Continued)

*Primary Examiner* — Courtney Harmon
(74) *Attorney, Agent, or Firm* — Hickman Becker Bingham Ledesma LLP; Stephen J. Walder, Jr.

(57) ABSTRACT

A computer-implemented method includes receiving a first input for a deterministic model and generating, in accordance with the model, a first output corresponding to the first input; the generating is performed in a first computation time. The method also includes storing the first input and the first output as a first input-output pair in a cache; the first input-output pair has a priority in the cache according to the first computation time. The method further includes subsequently receiving a second input for the model that is a duplicate of the first input; and generating a second output corresponding to the second input by retrieving the first output from the cache.

20 Claims, 4 Drawing Sheets

(56) References Cited

U.S. PATENT DOCUMENTS

| | | | |
|---|---|---|---|
| 2012/0042126 A1* | 2/2012 | Krick | G06F 12/0891 |
| | | | 711/E12.024 |
| 2012/0051537 A1* | 3/2012 | Chishti | H04M 3/5233 |
| | | | 379/265.11 |
| 2013/0006965 A1 | 1/2013 | Barbas | |
| 2014/0181072 A1 | 6/2014 | Wong | |
| 2015/0067088 A1* | 3/2015 | Guerin | H04L 67/51 |
| | | | 709/213 |
| 2015/0088919 A1 | 3/2015 | Hunter et al. | |
| 2015/0095581 A1 | 4/2015 | Stairs | |
| 2016/0077926 A1* | 3/2016 | Mutalik | G06F 16/1844 |
| | | | 711/162 |
| 2016/0246733 A1 | 8/2016 | Condict | |
| 2017/0315932 A1 | 11/2017 | Moyer | |
| 2019/0303480 A1* | 10/2019 | Canis | G06F 16/951 |
| 2021/0073808 A1* | 3/2021 | Gu | G06Q 20/367 |
| 2022/0051088 A1 | 2/2022 | Meng | |
| 2023/0079746 A1 | 3/2023 | Chen | |

OTHER PUBLICATIONS

U.S. Appl. No. 14/033,358, filed Sep. 20, 2013, Final Office Action, Oct. 5, 2016.
U.S. Appl. No. 14/033,358, filed Sep. 20, 2013, Office Action, Jun. 1, 2015.
U.S. Appl. No. 14/033,358, filed Sep. 20, 2013, Final Office Action, Nov. 10, 2015.
U.S. Appl. No. 14/033,358, filed Sep. 20, 2013, Advisory Action, Jan. 19, 2017.
Hunter, U.S. Appl. No. 14/033,358, filed Sep. 20, 2017, Interview Summary, Dec. 11, 2017.
Hunter, U.S. Appl. No. 14/033,358, filed Sep. 20, 2013, Office Action, Mar. 9, 2017.
Hunter, U.S. Appl. No. 14/033,358, filed Sep. 20, 2013, Interview Summary, Dec. 21, 2016.
Hunter, U.S. Appl. No. 14/033,358, filed Sep. 20, 2013, Interview Summary, May 1, 2017.
Hunter, U.S. Appl. No. 14/033,358, filed Sep. 20, 2013, Final Office Action, Sep. 21, 2017.
O'Neil et al., "The LRU-K Page Replacement Algorithm for Database Disk Buffering", SIGMOD Rec., Jun. 1993, vol. 22, No. 2, p. 297-306.
MSDN Library, "Dimension Set Entries", Microsoft Dynamics NAV 2013 Documentation, http://msdn.microsoft.com:80/en-us/library/hh169155(v=nav.70).aspx, dated Nov. 21, 2012, retrieved on Sep. 13, 2017, 22 pages.
Cormen et al., "Intorduction to Algorithms", The MIT Press, Massachusetts Institute of Technology, 2022, pp. 161-182.
Bojanowski et al., "EnrichingWord Vectors with Subword Information", arXiv:1607.04606v2 [cs.CL], Jun. 19, 2017, 12 pages.
Sanders et al., "A Baysian Approach for the Robust Optimisation of Expensive-To-Evaluate Functions" IEEE Transactions On Evolutionary Computation, May 9, 2019 (11 pages).

* cited by examiner

CACHING STRATEGY BASED ON MODEL EXECUTION TIME

FIELD OF THE INVENTION

The present invention relates to computing with large datasets, and more particularly to a caching scheme that facilitates reduced execution time of inference algorithms.

BACKGROUND

Many applications use large data collections, which often consist of repetitive samples. For example, machine generated database logs, social networks, web search or medical reports often contain a large proportion of duplicated content; it is not known in advance which samples are duplicated. Running an algorithm on such duplicated samples results in unnecessary calculations. One way to improve computational time for a dataset with repetitive samples is to use caches. Cache is an auxiliary memory which allows high-speed retrieval.

A Least Recently Used (LRU) caching algorithm is commonly used. In LRU caching, elements are added to the cache until cache capacity is reached. When that happens, the least recently used sample is replaced with the new incoming sample. In situations where inference execution time varies widely among different samples, LRU is a less desirable strategy, since LRU can focus attention on elements that are easy to recalculate instead of elements that require greater amounts of computational power.

DETAILED DESCRIPTION

Figure 1:
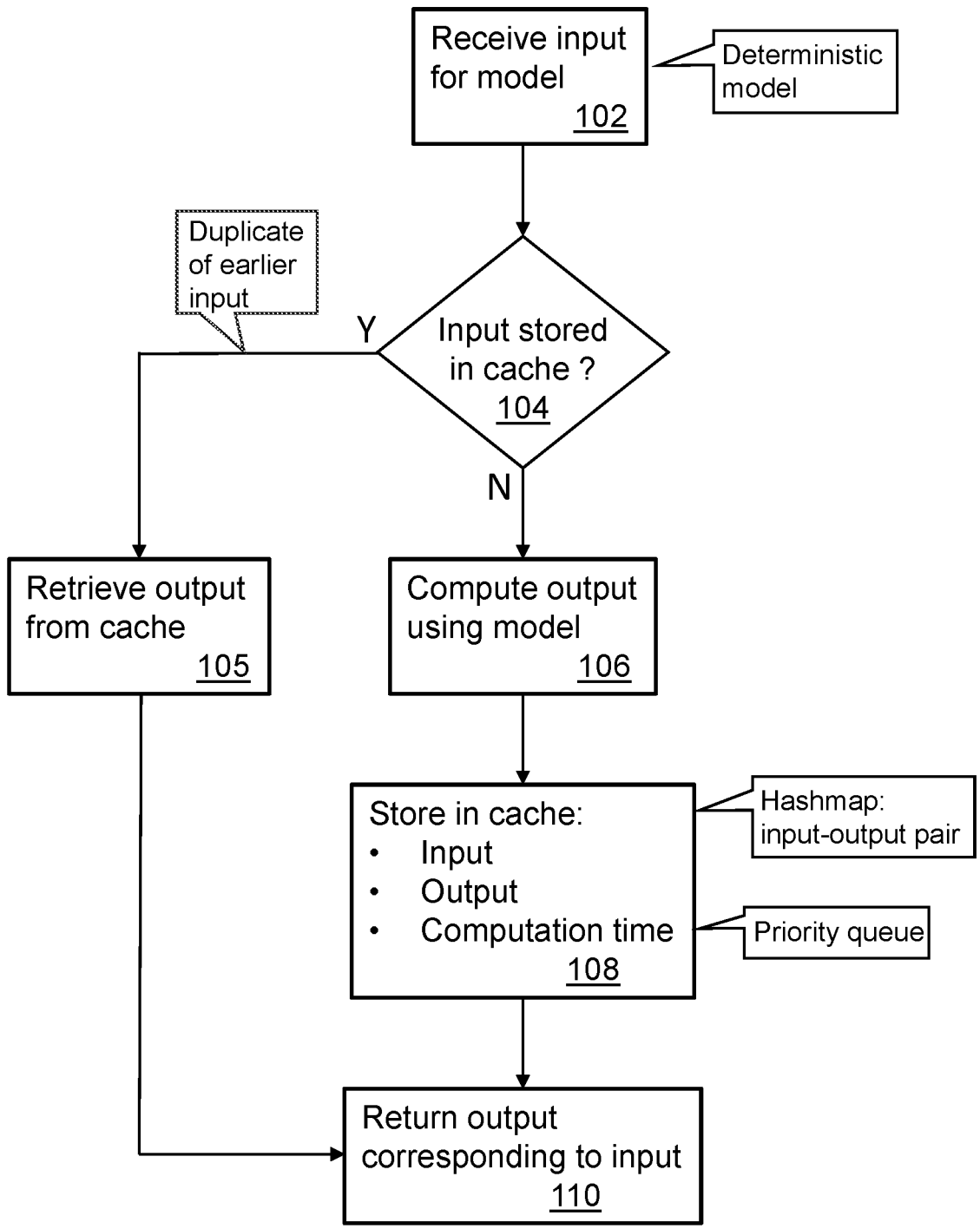
FIG. 1 is a flowchart depicting a procedure for caching input and output of a model according to a Model Score Cache (MSC) strategy, in accordance with embodiments of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In accordance with aspects of the disclosure, a strategy to cache the input i and output o of a deterministic model is based on the computation time t required to generate output o from the model. A deterministic model generates the same output o for a given input i; for example, deterministic machine learning (ML) model inference, extracting information from database, etc. This results in improved execution time for deterministic models, when the model encounters the same inputs over a period of time (as is usual in numerous applications). This caching strategy is referred to herein as Model-Score-Cache (MSC). When an input i is first encountered, the computed output o from the model is saved in an MSC cache; in various embodiments, the MSC cache is represented by a hashmap, where the key is input i and the value is output o. When the same input is encountered again, the output is fetched from the cache in MSC instead of recomputing. This saves computational resources, particularly when the underlying model is large.

In various embodiments where MSC is used with a deterministic model, input-output pairs are retained or added to the MSC cache based on the computation time t (time to compute the output based on the input, also referred to as inference time). When the cache is full, the sample that has the lowest inference time is replaced with the new data. MSC stores the input-output pair in a hashmap; this permits fast lookup in constant time O(1). The inference time t for each input-output pair (i, o) is stored in a Priority-Queue or Minimum Heap. The priority is decided based on the inference time t. Accordingly, (i) the smallest t, i.e. $t_{min}$, can be fetched in O(1) time; and (ii) a new t can be added in O(log K) time, where K is the size of the cache.

In accordance with an aspect of the disclosure, a computer-implemented method includes receiving a first input for a deterministic model and generating, in accordance with the model, a first output corresponding to the first input; the generating is performed in a first computation time. The method also includes storing the first input and the first output as a first input-output pair in a cache; the first input-output pair has a priority in the cache according to the first computation time. The method further includes subsequently receiving a second input for the model that is a duplicate of the first input; and generating a second output corresponding to the second input by retrieving the first output from the cache.

In accordance with another aspect of the disclosure, a machine-readable medium comprises instructions executable by a processor for performing operations. The operations include receiving a first input for a deterministic model and generating, in accordance with the model, a first output corresponding to the first input; the generating is performed in a first computation time. The operations also include storing the first input and the first output as a first input-output pair in a cache; the first input-output pair has a priority in the cache according to the first computation time. The operations further include subsequently receiving a second input for the model that is a duplicate of the first input; and generating a second output corresponding to the second input by retrieving the first output from the cache.

In accordance with an additional aspect of the disclosure, a processing system includes a processor and a memory that stores instructions; the instructions, when executed by the processing system, facilitate performance of operations. The operations include receiving a first input for a deterministic model and generating, in accordance with the model, a first output corresponding to the first input; the generating is performed in a first computation time. The operations also include storing the first input and the first output as a first input-output pair in a cache; the first input-output pair has a priority in the cache according to the first computation time. The operations further include subsequently receiving a second input for the model that is a duplicate of the first input; and generating a second output corresponding to the second input by retrieving the first output from the cache.

Prediction from a Model with MSC

FIG. 1 is a flowchart depicting a procedure 100 for caching input and output of a model according to a Model Score Cache (MSC) strategy, in accordance with embodiments of the disclosure. In step 102, a processing system receives an input for a model; in these embodiments, the model is understood to be a deterministic model (that is, the model generates the same output for a given input). The system then determines whether the input is already stored in the MSC cache (step 104). If so, the new input is a duplicate of an earlier input, and the output is also stored in the MSC cache. The output is retrieved from the cache (step 105) and returned as an output corresponding to the new input (step 110).

If the input is not stored in the cache (for example, the input is encountered for the first time), the output is computed using the model (step 106). The input, output and computation time are then added to the cache (step 108), and the output is returned corresponding to the input (step 110). In this embodiment, the input i and output o are stored in a hashmap as a value pair; the computation time t is stored in a priority queue. The priority queue is ordered according to t, with higher priority given to the longer computation times (that is, i-o pairs that are more costly to generate are retained in the cache for longer periods of time), and the lowest priority to the shortest computation time $t_{min}$ (that is, the i-o pair that is least costly to generate can be removed from the cache to make room for an i-o pair with a computation time greater than $t_{min}$).

Adding Elements to MSC

Figure 2:
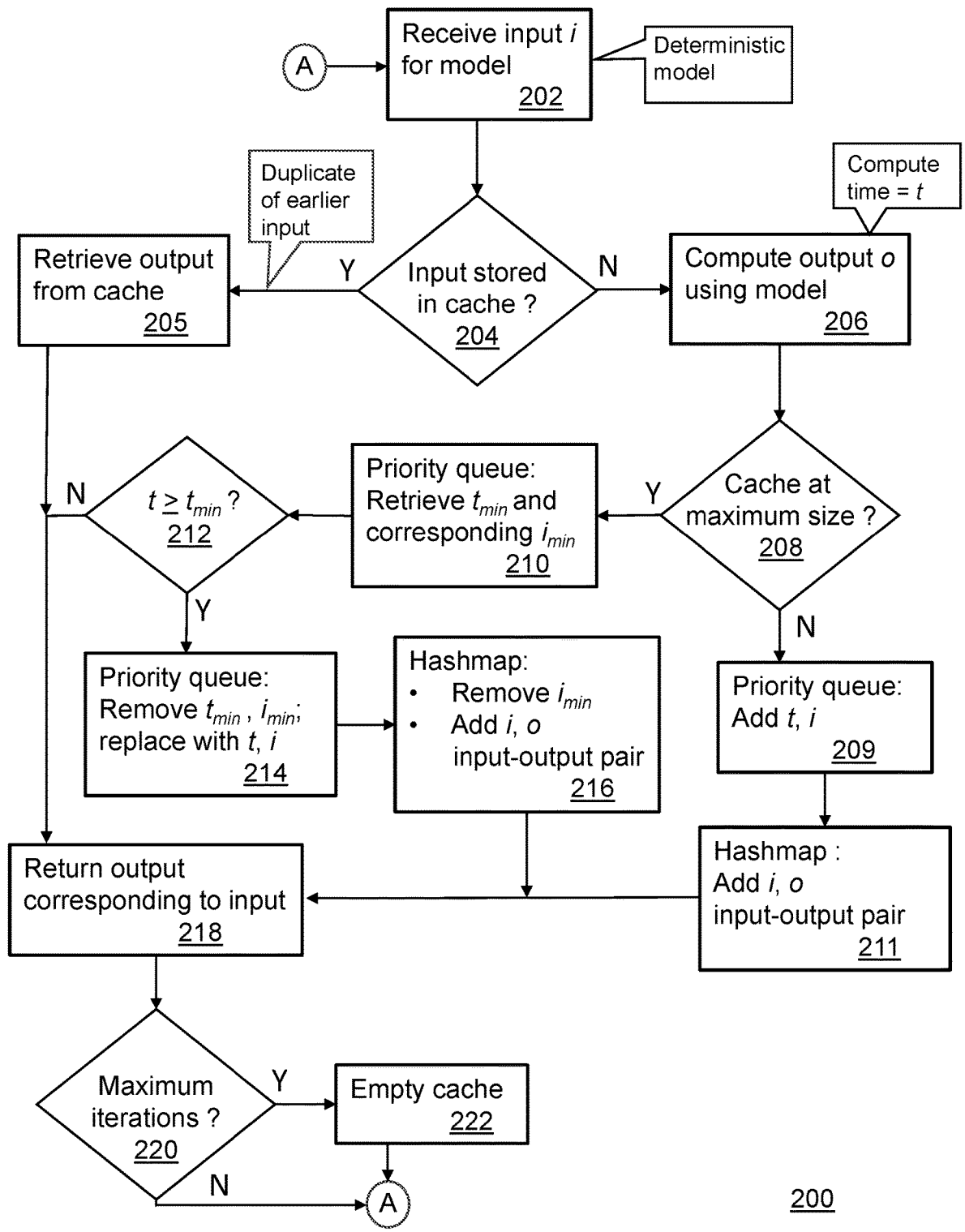
FIG. 2 is a flowchart depicting a procedure for adding elements to a cache of limited size according to the MSC strategy, in accordance with additional embodiments of the disclosure.

FIG. 2 is a flowchart depicting a procedure 200 for adding elements to a cache of limited size according to the MSC strategy, in accordance with additional embodiments of the disclosure. In various embodiments, a hashmap stores inputs and outputs i, o as key value pairs; the cache has a maximum size K.

In step 202, a processing system receives an input for a deterministic model. The system then determines whether the input is already stored in the MSC cache (step 204). If so, the new input is a duplicate of an earlier input. Accordingly, the corresponding output is also stored in the MSC cache, and it is not necessary to compute the output from the new input. The output is retrieved from the cache (step 205) and returned as an output corresponding to the new input (step 218).

If the input is not stored in the cache (for example, the input i is encountered for the first time), the output o is computed in a computation time t using the model (step 206). If the cache is not at the maximum size K (step 208), the input i and output o are added to the hashmap, and the input i and computation time t are added to a priority queue (steps 209, 211). In this embodiment, the computation time t is the priority key for the queue. The output o is also returned as an output corresponding to the input i (step 218).

If the cache is at its maximum size, the system retrieves the smallest computation time value $t_{min}$ and corresponding input $i_{min}$ from the priority queue (step 210), and compares the computation time t with $t_{min}$ (step 212). If t is greater than or equal to $t_{min}$, $t_{min}$ and $i_{min}$ are removed from the priority queue and replaced with t and i (step 214); $i_{min}$ is also removed from the hashmap, and value pair i, o is added to the hashmap (step 216). The cache thus retains i-o pairs that are more costly to generate than those based on subsequently encountered inputs. The output o is also returned as an output corresponding to the input i (step 218).

In additional embodiments, a maximum number M of iterations of procedure 200 may be specified. When this maximum number is reached (step 220), the cache is emptied (step 222) to avoid keeping outlier input-output pairs with long computation times (and thus high priority) and occupy space in the cache without being used again. In an embodiment, the parameter M is chosen based on a preproduction dataset and/or by monitoring the average execution time.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
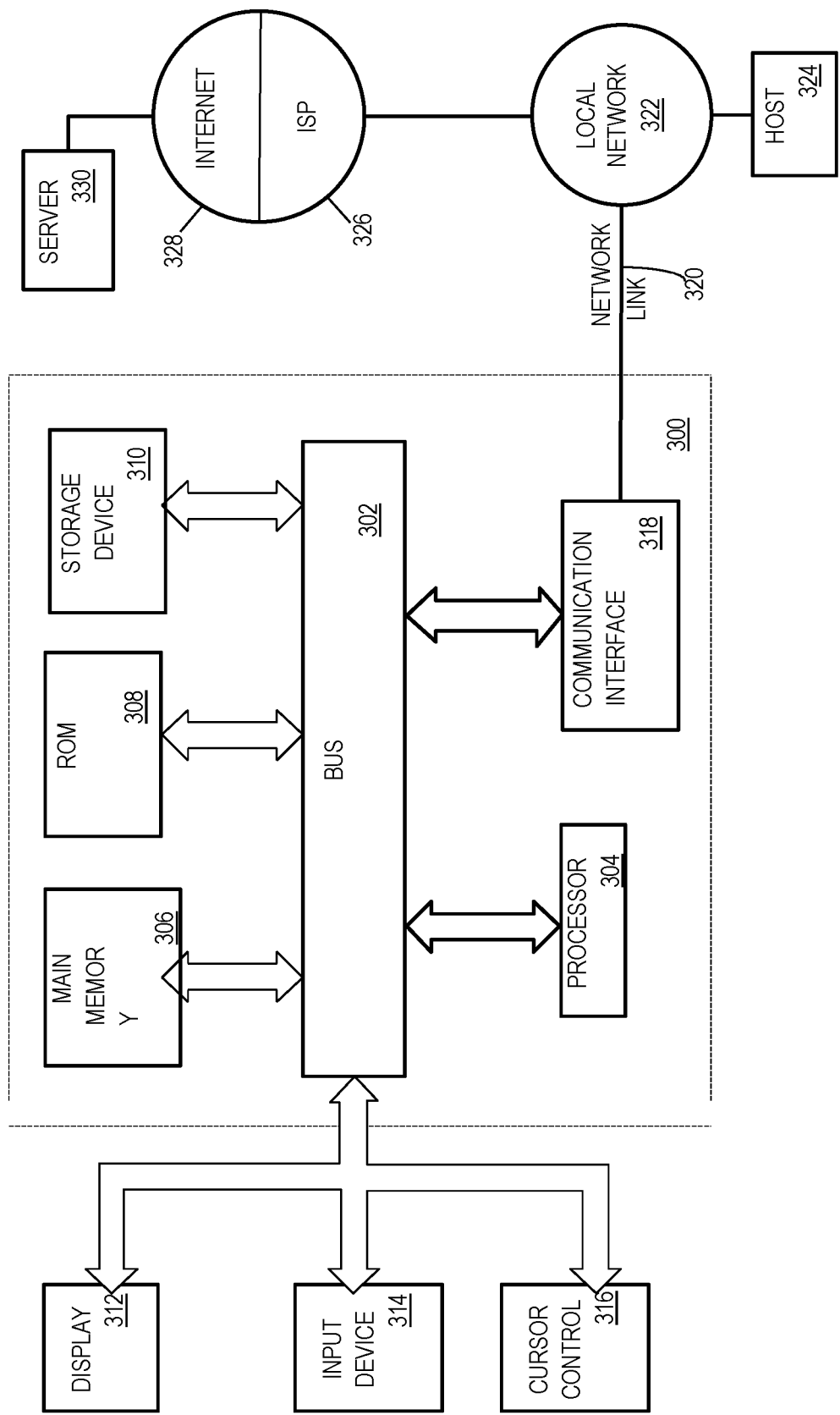
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
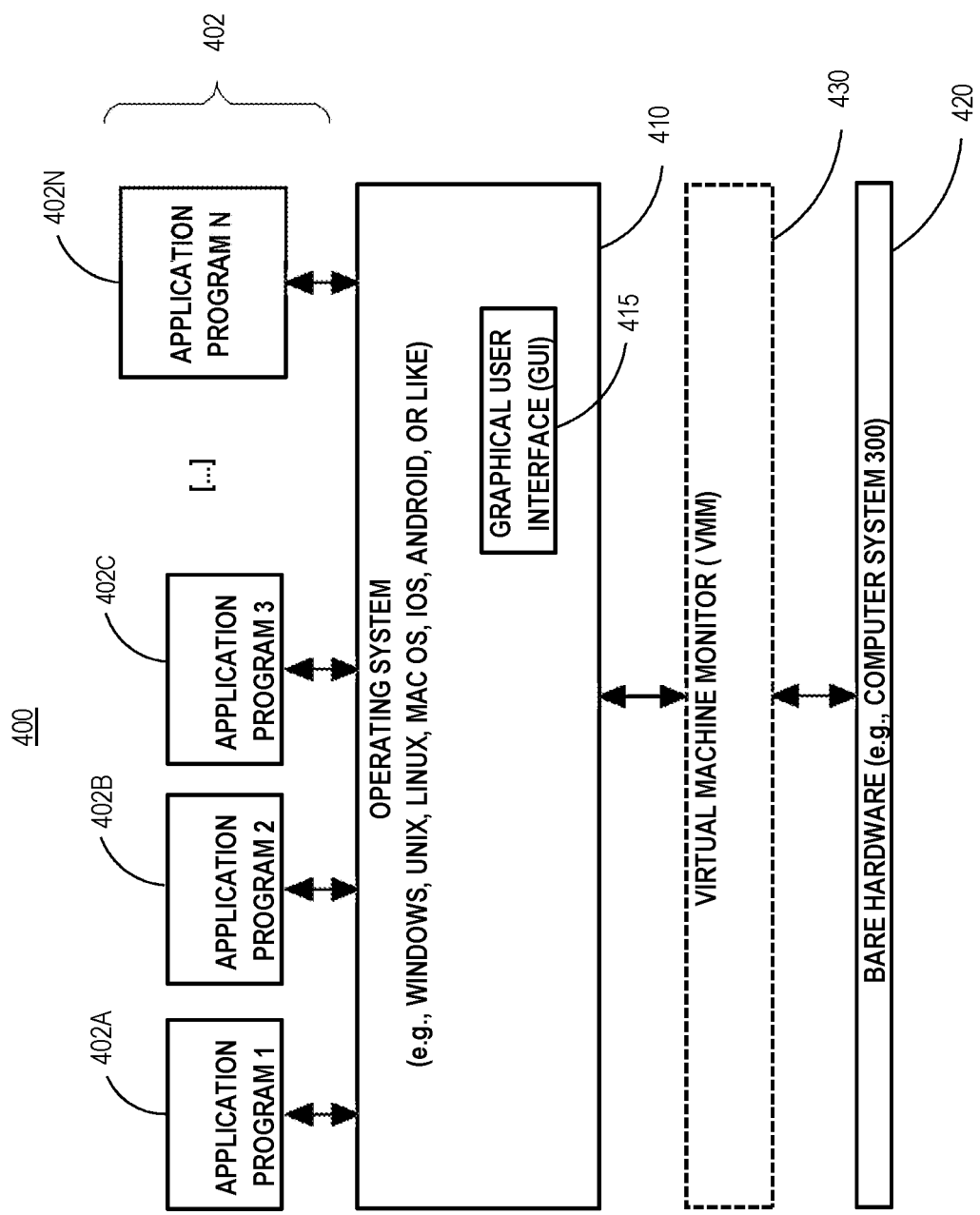
FIG. 4 is a block diagram of a basic software system that may be employed for controlling the operation of a computer system upon which an embodiment of the invention may be implemented.

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a first input for a model, wherein the model is a deterministic model;
   generating, in accordance with the model, a first output corresponding to the first input, wherein the generating is performed in a first computation time;
   storing the first input and the first output as a first input-output pair in a cache, the cache comprising a plurality of elements each including an input-output pair and a corresponding computation time associated therewith, wherein:
   for each element in the plurality of elements, a corresponding computation time is an amount of time for the model to compute the output from the input in the input-output pair of the element,
   the first input-output pair has a priority in the cache according to the first computation time, and
   replacement of elements in the cache is based on the corresponding computation times of the elements;
   subsequently receiving a second input for the model that is a duplicate of the first input; and
   generating a second output corresponding to the second input by retrieving the first output from the cache.

2. The computer-implemented method according to claim 1, further comprising:
   comparing a new computation time associated with a new input-output pair not included in the cache with a minimum computation time associated with the elements of the cache;
   in accordance with a number of elements of the cache being equal to a maximum number and the new computation time being at least equal to the minimum computation time, replacing the input-output pair associated with the minimum computation time by the new input-output pair.

3. The computer-implemented method according to claim 2, wherein each input-output pair in the plurality of elements is stored in a hashmap.

4. The computer-implemented method according to claim 3, wherein the input-output pair comprises a key value pair stored in the hashmap.

5. The computer-implemented method according to claim 2, wherein the instructions further comprise instructions executable by the processor to empty the cache in accordance with a predetermined number of iterations of the procedure being performed.

6. The computer-implemented method according to claim 2, wherein the first input and the first computation time are stored in a priority queue, wherein each element of the priority queue comprises an input and a computation time associated therewith, the priority determined according to the computation time.

7. A non-transitory computer-readable medium comprising instructions executable by a processor to:
   receive a first input for a model, wherein the model is a deterministic model;
   generate, in accordance with the model, a first output corresponding to the first input, wherein the generating is performed in a first computation time;
   store the first input and the first output as a first input-output pair in a cache, the cache comprising a plurality of elements each including an input-output pair and a corresponding computation time associated therewith, wherein:
      for each element in the plurality of elements, a corresponding computation time is an amount of time for the model to compute the output from the input in the input-output pair of the element,
      the first input-output pair has a priority in the cache according to the first computation time, and
      replacement of elements in the cache is based on the corresponding computation times of the elements;
   subsequently receive a second input for the model that is a duplicate of the first input; and
   generate a second output corresponding to the second input by retrieving the first output from the cache.

8. The non-transitory computer-readable medium of claim 7, wherein the instructions further comprise instructions executable by the processor to:
   compare a new computation time associated with a new input-output pair not included in the cache with a minimum computation time associated with the elements of the cache;
   in accordance with a number of elements of the cache being equal to a maximum number and the new computation time being at least equal to the minimum computation time, replace the input-output pair associated with the minimum computation time by the new input-output pair.

9. The non-transitory computer-readable medium of claim 8, wherein each input-output pair in the plurality of elements is stored in a hashmap.

10. The non-transitory computer-readable medium of claim 9, wherein the input-output pair comprises a key value pair stored in the hashmap.

11. The non-transitory computer-readable medium of claim 7, wherein the model comprises a deterministic machine-learning model.

12. The non-transitory computer-readable medium of claim 8, wherein the instructions comprise a computer-implemented procedure, and wherein the instructions further comprise instructions executable by the processor to empty the cache in accordance with a predetermined number of iterations of the procedure being performed.

13. The non-transitory computer-readable medium of claim 8, wherein the first input and the first computation time are stored in a priority queue, wherein each element of the priority queue comprises an input and a computation time associated therewith, the priority determined according to the computation time.

14. A system comprising:
   a processor; and
   a memory that stores executable instructions that, when executed by the processor, facilitate performance of operations, the operations comprising:
   receiving a first input for a model, wherein the model is a deterministic model;
   generating, in accordance with the model, a first output corresponding to the first input, wherein the generating is performed in a first computation time;
   storing the first input and the first output as a first input-output pair in a cache, the cache comprising a plurality of elements each including an input-output pair and a corresponding computation time associated therewith, wherein:
      for each element in the plurality of elements, a corresponding computation time is an amount of time for the model to compute the output from the input in the input-output pair of the element,
      the first input-output pair has a priority in the cache according to the first computation time, and
      replacement of elements in the cache is based on the corresponding computation times of the elements;
   subsequently receiving a second input for the model that is a duplicate of the first input; and
   generating a second output corresponding to the second input by retrieving the first output from the cache.

15. The system of claim 14, wherein the operations further comprise:
   comparing a new computation time associated with a new input-output pair not included in the cache with a minimum computation time associated with the elements of the cache;
   in accordance with a number of elements of the cache being equal to a maximum number and the new computation time being at least equal to the minimum computation time, replacing the input-output pair associated with the minimum computation time by the new input-output pair.

16. The system of claim 15, wherein each input-output pair in the plurality of elements is stored in a hashmap.

17. The system of claim 15, wherein the input-output pair comprises a key value pair stored in the hashmap.

18. The system of claim 14, wherein the model comprises a deterministic machine-learning model.

19. The system of claim 15, wherein the operations comprise a computer-implemented procedure, and wherein the operations further comprise emptying the cache in accordance with a predetermined number of iterations of the procedure being performed.

20. The system of claim 15, wherein the first input and the first computation time are stored in a priority queue, wherein each element of the priority queue comprises an input and a computation time associated therewith, the priority determined according to the computation time.

* * * * *